United States Patent [19]
Chapman

[11] 3,922,884
[45] Dec. 2, 1975

[54] COUPLINGS

[75] Inventor: Charles Wallace Chapman, Winchelsea, England

[73] Assignee: Charles W. Chapman (Consultants) Limited, Horley, England

[22] Filed: Nov. 30, 1973

[21] Appl. No.: 420,540

[30] Foreign Application Priority Data
Dec. 1, 1972  United Kingdom............... 55595/72
Feb. 1, 1973  United Kingdom................ 5096/73
July 26, 1973  United Kingdom.............. 35546/73

[52] U.S. Cl. .............................. 64/19; 64/6; 64/12; 64/27 R
[51] Int. Cl.² .................................... F16D 3/54
[58] Field of Search ............. 64/21, 19, 27 R, 12, 6

[56] References Cited
UNITED STATES PATENTS
2,910,844  11/1959  Chapman................................ 64/19
3,246,485  4/1966  Chapman............................ 64/27 R
3,528,264  9/1970  Chapman................................ 64/19
3,650,124  3/1972  Chapman................................ 64/19

FOREIGN PATENTS OR APPLICATIONS
728,679  4/1955  United Kingdom..................... 64/19
1,174,353  2/1964  Germany................................ 64/19

Primary Examiner—Samuel Scott
Assistant Examiner—Randall Heald
Attorney, Agent, or Firm—Robert Andrew Brown

[57] ABSTRACT

A rotatable coupling having a low stiffness to torque ratio over a desired speed range. The coupling comprises a driving and a driven member rotatable about a common axis and between which is connected one or more coupling elements for transmitting torque from the driving to the driven member, the or each coupling element being arranged to prevent rotational deflection of the driving member relative to the driven member in the direction of drive when the coupling is rotating below a predetermined speed, and to allow rotational deflection of the driving member relative to the driven member in either direction of rotation when the coupling rotates at a speed above the predetermined speed.

13 Claims, 16 Drawing Figures

COUPLINGS

This invention relates to a coupling for transmitting a drive between rotatable driving and driven members, of the kind comprising at least one, though, for kinetic balance, preferably at least two, coupling elements (or connectors) connected between the members such that, at normal operating speeds and loads, the coupling has a low, or even zero torsional stiffness (herein referred to as ZTS).

It has been theoretically proven and experimentally confirmed that if a coupling having ZTS be connected between two parts of a rotating system and be capable of transmitting a torque, then, if one part of the system be subjected to torques fluctuating even violently above and below a mean torque, the torque transmitted to the other part of the system will be the mean torque completely devoid of any fluctuations above or below the mean torque.

It has also been proven and experimentally confirmed that if the ratio of the torsional stiffness of a coupling to a mean torque being transmitted at any time (referred to as the "S/T ratio") have a low value, then, if the one part of the rotating system be subjected to torque fluctuations of a given value above and below the mean value, the value of the torque fluctuations transmitted through the coupling to the other part of the system will be almost directly proportional to the S/T ratio. Thus, if the S/T ratio at the time, speed, and mean torque considered be zero, there will be no transmitted torque fluctuations, irrespective of the fluctuations on the transmitting side and the total inertias on either side; an S/T ratio not above about 10 will only allow more or less negligible fluctuations to be transmitted if the inertia on the transmitted side be low relative to that on the transmitting side, but if the inertia on the transmitted side be high relative to that on the transmitting side an S/T ratio much nearer zero will be necessary to reduce the transmitted fluctuations to negligible values; if the S/T ratio have a relatively high value — say 50 or more — the coupling will have little effect in reducing the transmitted fluctuations irrespective of the values of the two inertias unless the ratio of the transmitted inertia to that of the transmitting inertia be extremely low, approaching zero.

With a coupling having zero or a very low S/T ratio there is, however, a risk of overstressing the coupling at starting and low speeds when the kinetic energy of the system is very low. If the starting torque on the driver has a high value in relation to its inertia, and if that torque be rapidly applied, the driver will accelerate rapidly ahead of the driven part of the system which will only be accelerated by the torque in the coupling due to its deflection, and this torque will be negligible with a very low S/T ratio. This increase of speed of the driver relative the driven system will be aggravated if the inertia of the driven side be high, and to equalise the speeds before the coupling is deflected far beyond its safe deflection may necessitate "stops" to prevent the coupling itself being overstressed; even with only moderately high driven inertia, the impact when the stops make contact may be so great that the stops themselves fail and cases have been known of very low S/T ratio couplings disintegrating in a fraction of a second after initiating the starting torque; in other cases the sudden equalising of the speeds with high inertias has caused serious damage to parts of one or other or both of the two parts of the combined system.

Accordingly, an object of this invention is to prevent the driver accelerating ahead of the driven system when starting up and working up to speed a system coupled by a coupling having ZTS, or a very low S/T ratio at normal operating speeds and torques.

In couplings of the kind referred to above the connectors may be so arranged that when the coupling rotates the centrifugal forces acting on the connectors transmit a torque (herein also referred to as the centrifugal torque or C.F.T.) from the driving to the driven member, or vice versa.

The configuration is generally such that, upon relative rotational deflection between the driving and driven members from a datum position the centres of gravity of the connectors are moved inwardly or outwardly relative to the axis of rotation so that, at a given speed, any change in the torsional deflection results in a change in the value of the C.F.T.

Thus, at a given speed and deflection of the coupling, if the load being driven is reduced from the value that just balances the C.F.T. at that deflection, the C.F.T. will exceed the drive or load torque and the centre of gravity of the connectors will move outwards, so altering the deflection of the coupling and further increasing the C.F.T. in excess of the drive or load torque. Consequently, unless the load torque be promptly increased, the centres of gravity of the connectors will continue to move outwards until halted by some means such as a stop device, or until the line joining the centre of gravity of each connector and the connection of the connector to the driving or driven member passes through the axis of rotation. In some cases this can be very undesirable.

A further object of the invention is thus to overcome this potential disadvantage.

According to this invention there is provided a rotatable coupling comprising a driving and a driven member rotatable about a common axis and between which is connected one or more coupling elements for transmitting torque from the driving to the driven member, the or each coupling element being arranged to prevent rotational deflection of the driving member relative to the driven member in the direction of drive when the coupling is rotating below a predetermined speed, and to allow rotational deflection of the driving member relative to the driven member in either direction of rotation when the coupling rotates at a speed above the predetermined speed.

The or each coupling element may be arranged such that, on rotation of the coupling, the centrifugal force on the or each coupling element acts to exert between the members a centrifugal torque which tends to deflect the driven member relative to the driving member in the direction of drive.

The coupling may further comprise counter torque means arranged to exert between the members a counter torque greater than and opposite to the centrifugal torque for coupling speeds up to the predetermined speed.

Preferably, the arrangement of the or each coupling element and the counter torque means is such that, over a range of deflection and/or speeds greater than the predetermined speed, the increase in centrifugal torque resulting from an increase in deflection between the members, is opposite and substantially equal to the corresponding increase of the counter torque exerted by the counter torque means.

The counter torque means may be arranged to give the coupling any desired S/T ratio at one or more predetermined speeds and deflections. The counter torque means may also be arranged to locate the driving and driven members relative to one another when the system is at rest so that the coupling elements have the desired static configuration and retain that configuration up to the predetermined speed.

If the drive reverses direction, or if the driven member over-runs the driver, the coupling elements will tend to buckle, and this tendency will be increased by the C.F.T. The counter torque means will oppose this buckling but will normally be insufficient to prevent it. It may then be desirable to provide, by one or more suitable additional devices, means to limit this buckling to a predetermined extent. Such additional device or devices may, for example, be one or more resilient stops to limit the rotational deflection of the driver relative to the driven member in the case of a drive reversal or over-run.

The invention will now be described, by way of example with reference to the accompanying drawings, in which.

Figure 1:
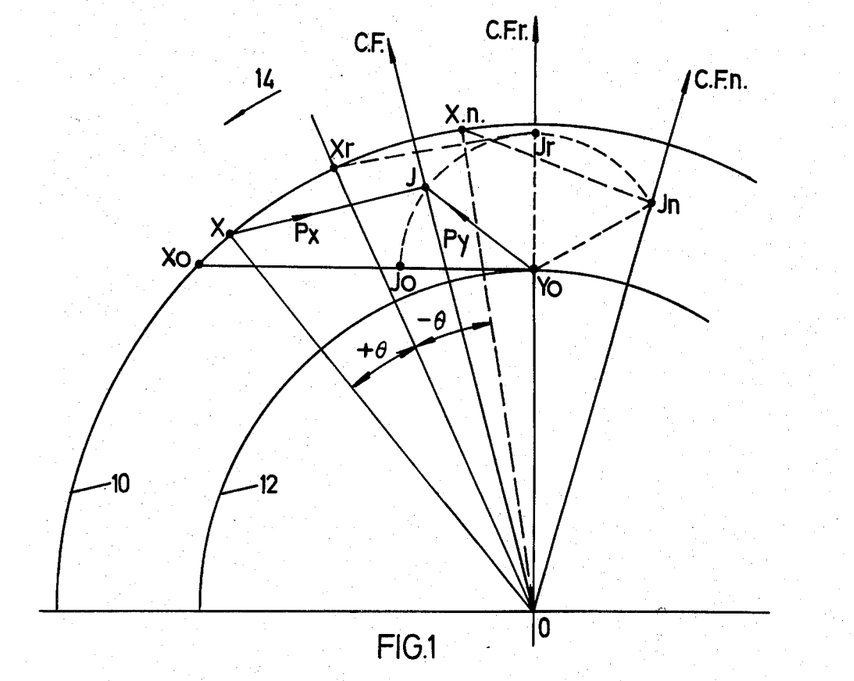
FIG. 1 is a diagrammatic representation of a rotatable transmission coupling according to the invention showing the forces acting on the two links (of unequal length); in this Figure the driving member is depicted as deflecting relative to the driven member as link Jo Yo swings outward about pivot Yo.
Figure 2:
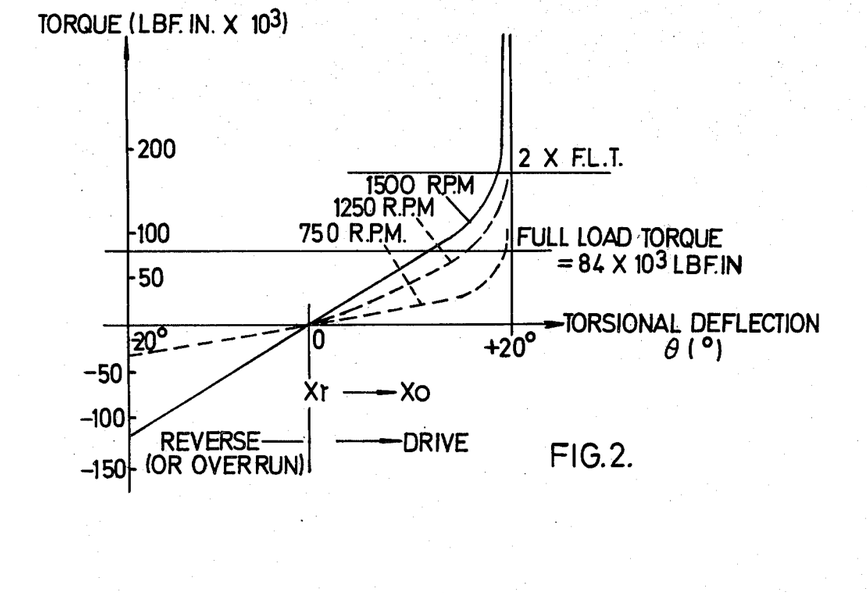
FIG. 2 shows the variation of coupling torque with angle of deflection at different speeds for a coupling of the kind illustrated in FIG. 1.

Referring to FIG. 1, it will be seen that the coupling comprises an outer flange 10 and a flange 12 (only parts of which are shown), and a number of connector elements in the form of jointed links Xo Jo and Jo, Yo. The points X, J and Y are pivots, fitted preferably with self-lubricating bearings and O is the centre of rotation of the coupling. In this embodiment, X is shown at a greater radius from O than is Y, and this is a preferred arrangement which allows the driving and driven flanges to be accommodated one within another, thus keeping the axial length of the coupling to a minimum. The lengths OXo and OYo may, however, be varied, within practical limits — they may, for example, be equal.

Let link Xo Jo be referred to as the X link and Jo Yo as the Y link, and consider the outer flange 10 as the driving member and the inner flange 12 as the driven member of the coupling. Let the angle $\theta$ in FIG. 1 indicate the torsional deflection of the coupling, and let $\theta = 0$ when the point X is at Xr and the Y link radial. The coupling operates as follows:

In the position Xo Jo Yo the links are substantially in-line, the system is at rest, and the torsional stiffness of the coupling is almost infinite. If now the outer flange 10 is rotated anti-clockwise (as indicated by 14), say by an electric motor being switched on, the system will accelerate, with the links in line, thereby preventing rotational deflection of the driving member relative to the driven member as though the masses of the driving and driven members were one combined-inertia mass. The torque on the driving member would fall, as the speed rises, from its initial high value towards its steady-speed "full-load" value. Simultaneously, centrifugal forces C.F., acting on the linkages, and inducing forces Px and Py in the two links, cause a "centrifugal torque" or C.F.T. to be applied between the driving and driven flanges, opposing the drive and tending to accelerate the driven member. When the coupling has accelerated up to a speed at which the C.F.T. equals the driving torque the links begin to move out of line, Xo moving towards the position Xr. This allows rotational deflection of the driving member relative to the driven member to occur in either direction of rotation.

If, when the driving torque has fallen to its full-load value, the driven flange is unloaded, then, neglecting frictional losses in the system, the centrifugal forces acting on the links continue to urge the pivot J outwards, tending to slow the driving flange and speeding up the driven flange. The centrifugal torque falls almost linearly until the Y link is radial and the X link in the position Xr; in this position the centrifugal torque is zero and the inertia of the driven member may cause it to overshoot the position Xr Jr Yo slightly before being pulled back due to the slight C. F. torque reversal which then immediately occurs, and there may follow a slight oscillation about the position where the Y link is radial until a steady state ensues due to damping.

If now an external load be applied to the driven flange, the driving flange will move ahead of the driven flange to a position, say, X, J, Yo. In this position the centrifugal torque will again oppose the driving torque, and apply a torque to the driven member in the direction of the driving torque: if for example the driving flange is on the output shaft of a 2,000 H.P. electric motor running at 1500 r.p.m. with $\theta$ say 12°, the torque across the coupling will be about 84,000 lbF. in. for a stiffness of some 400,000 lbF. in/radian. The stiffness/torque ratio of such a coupling would thus be about 4.75 — well below that at which transmitted vibrations become measurable.

It will be appreciated that, in the coupling according to FIG. 1, the centrifugal torque increases as the linkage is deflected from its "no-load" configuration at any speed (when the Y link is radial at Yr), in contrast to previous couplings of this kind in which the centrifugal torque increases as the linkage is deflected from its static configuration. If the angle of torsional deflection θ of the coupling is considered positive as the point X moves from Xr towards Xo and negative as X moves from Xr away from Xo (in FIG. 1), then for positive values of θ during operation of the coupling the centrifugal torque urges the flange Y in the same direction of rotation as flange X (thus opposing the driving torque) and for negative value of θ the centrifugal torque urges Y in the opposite direction of rotation to that of X.

Figure 3:
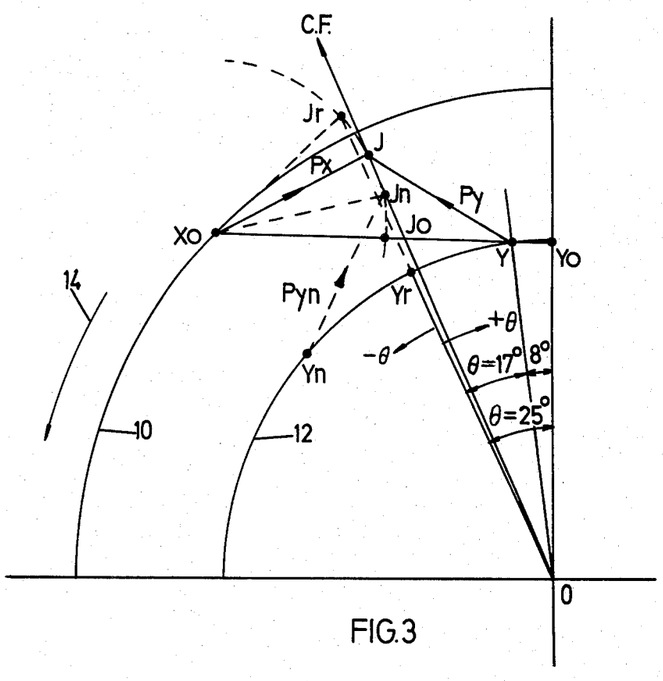
FIG. 3 is a diagrammatic representation of a rotatable coupling similar to that shown in FIG. 1 (but with links of equal length) in this Figure the driven member is depicted as deflecting relative to the driving member with link Xo Jo swinging outward about pivot Xo.

Referring now to FIG. 3, position Xo Jo Yo shows the linkage in-line at rest. The centrifugal force will depend on the effective weight at J, the radius OJ and the square of the speed of rotation. This force has a moment about X equal to the distance of the line of action of the centrifugal force from X multiplied by the centrifugal force itself, and to maintain equilibrium this moment must balance the opposing moment from the pull in the Y link. In this diagram where Y is shown deflecting relative to X, θ is again zero when the Y link is radial at Yr and is positive as Y moves towards Yo and negative as Y moves towards Yn. Consider a pivot Y at radius of 7 inches from centre O, pivot X on a driving flange at a radius of 10 inches from O, and X and Y links each of length 3.5 inches with a motor of the size indicated above. Assume a pin-and-fork connection between the two links at J, and an effective weight at this point of about 4 lbF.

Figure 4:
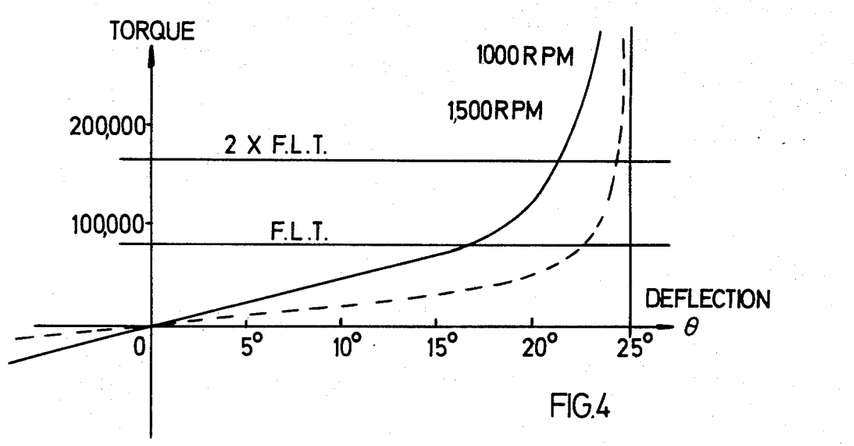
FIG. 4 is a plot similar to that of FIG. 2 for the coupling of FIG. 3.

FIG. 4 shows the resultant torque curve, and it will be seen that at the full load torque of 84,000 lbF. in. at zero speed $\theta = 25°$ (when the links are in line); at 1,000 r.p.m. θ would be about 22½°; and at a full speed of 1500 r.p.m. $\theta = 17°$ — that is, the linkage has deflected some 8° from its in-line position. The coupling's torsional stiffness is almost constant and relatively low from $\theta = 0$ to about $\theta = 15°$, after which it increases rapidly with further deflection, approximating infinity at the in-line position with $\theta =$ about 25°.

Figure 5:
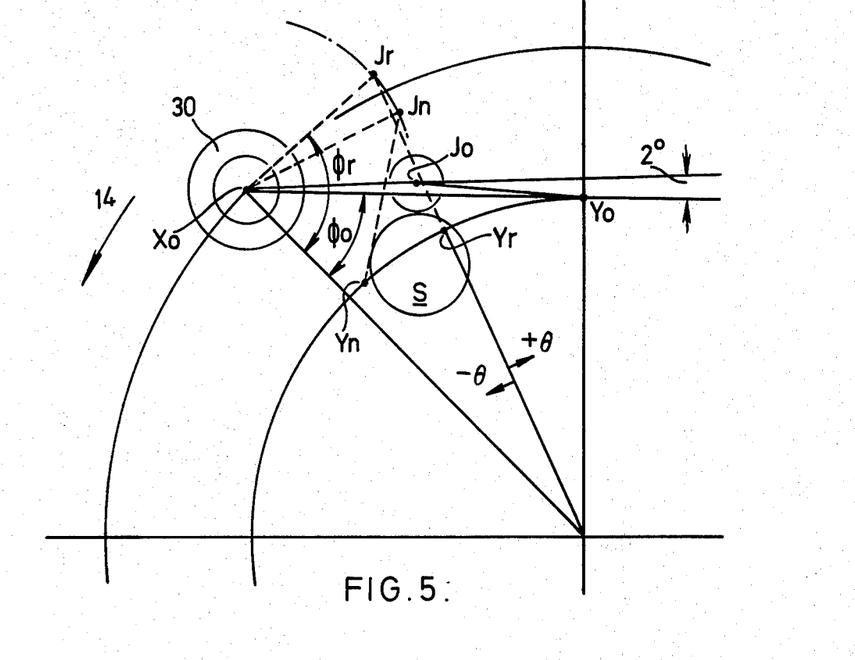
FIG. 5 is a diagram similar to FIGS. 1 and 3, the coupling linkage, where it is pivoted to the driving member, being fitted with a torsionally resilient bush which can act as a counter torque means.

In FIG. 5 counter torque means in the form of a torsionally resilient bush 30, for example of the kind marketed under the registered trade mark "metalastik" is provided at the pivot X to apply a light clockwise bias torque to the X link. A stop S is provided to limit the movement of J clockwise about pivot Xo, and thereby prevent rotational deflection of the driving member relative to the driven member in the direction of drive. Such stops may be fitted to either or both of the members X and Y and could be arranged to act on any part of the linkage between X and Y; or they could alternatively act between the two members themselves. It will be found that the "negative" centrifugal torque increases in value for increasing negative values of θ until θ is about $- 20°$ (see FIG. 7); after which its value tends to fall, and such stops could prevent the linkage continuing to deflect beyond this point of maximum negative centrifugal torque. Alternatively or additionally a stop or stops preferably between the driving and driven members themselves may be arranged to halt the deflection of the coupling from its at-rest configuration (Xo Jo Yo) when or before the Y-link is radial, so preventing the coupling deflecting to θ negative. Such stops in this case are preferably resilient. An example of such a stop, is illustrated and described with reference to FIG. 15.

Figure 6:
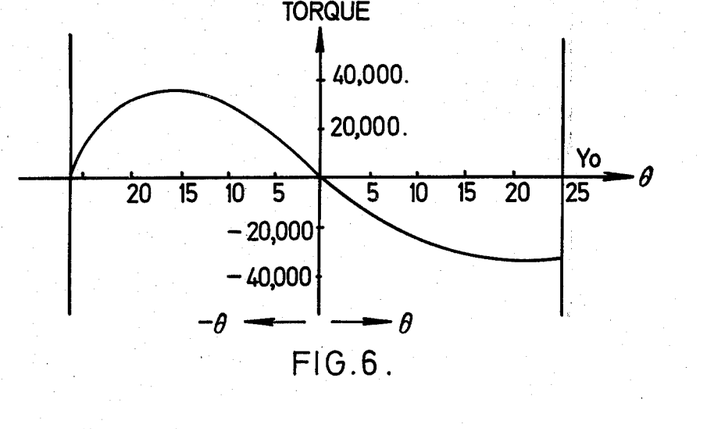
FIGS. 6 and 7 show torque curves for the coupling of FIG. 5.
Figure 7:
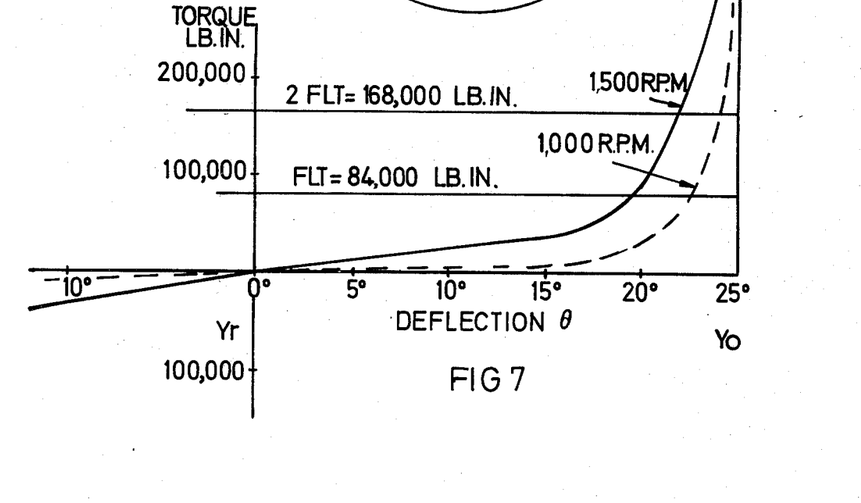

Still referring to FIG. 5, assume an at-rest linkage position Xo Jo Yo in which Xo Jo is 2° (although the stop S may be arranged such that this angle is appreciably greater) above line Xo Yo and let a torsionally resilient bush at X have a rating of 100 lbF. in. per degree of deflection. The bush would be untwisted when the X link is in line Xo Yo and would thus exert a clockwise torque at Yo of 200 lbF. in. about X with the links in the position shown, giving a downward load at Jo of about 57 lbF to be resisted by the stop S. When the coupling has accelerated up to a speed at which the C.F.T. minus the counter torque provided by the resilient bush equals the driving torque, J moves outwards and Y moves towards Yr, increasing the angle φ and the downward load on J. This allows rotational deflection of the driving member relative to the driven member to occur in either direction of rotation. As Y moves further from Yr towards Yn with the torsional deflection θ negative, J moves inward and the centrifugal torque is reversed. Again consider a flange-and-linkage arrangement of the dimensions given earlier, with the same driving motor. The angle φ in FIG. 5 has a value of about 44.5° when the bush is untwisted, and FIG. 6 shows the torque curve obtained due to the resilient bush at Xo, whilst FIG. 7 shows the torque curves from the combination of bush twist and C.F. With the bush chosen, for the dimensions being considered, the coupling carries full load torque at 1500 r.p.m. at about $\theta = 20°$ whereas without the bush (see FIG. 4) the corresponding value of θ was about 17°. The torque on the coupling from the resilient bush at Xo will be seen to oppose that from the C.F., and the coupling is thus somewhat stiffer at full load and speed with the bush at Xo, although appreciably softer at reduced loads as a comparison of FIGS. 4 and 7 will show.

Instead of the resilient bush 30 at Xo for locating the linkage in the desired configuration at rest and below the predetermined speed, other means such as described below with reference to FIGS. 8 to 10 may be employed.

Figure 8:
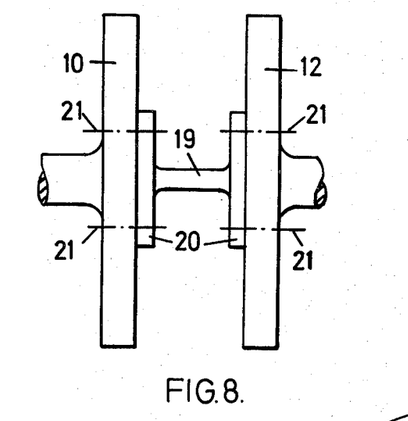
FIGS. 8 and 9 show side views and FIG. 10 an end view of couplings each having an alternative form of counter torque means (the connectors are not shown)

The coupling shown in FIG. 8 has counter torque means in the form of a torsion bar 19 formed integrally with flanges 20 which by means of bolts or the like at 21 are secured to the driving member 10 and the driven member 12 respectively.

Figure 9:
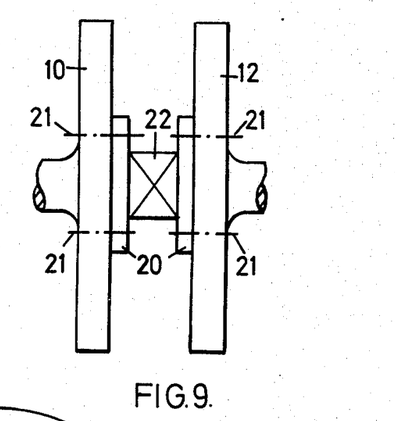

In FIG. 9 the counter torque means takes the form of a rubber or the like member 22, preferably bonded to flanges 20 whereby it is secured to the driving and driven members as in FIG. 8.

Figure 10:
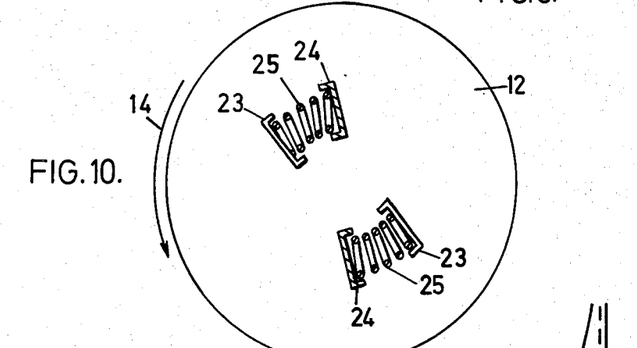

In FIG. 10 the counter torque means takes the form of two (for balance) springs 25 acting between projections 23 and 24 from the faces of the driving and driven members respectively. The spring may be a variable rate spring so that the counter torque varies non-linearly with deflection.

It will be evident from the foregoing description that a coupling embodying the invention may have its torque/deflection characteristics varied by suitably changing the counter torque means or by using a suitable combination of such means. Separate "rider" weights may be added at or near J to vary the effective weight at J. Alterations to the link length ratio and to the number of links per linkage and the number of linkages per coupling, as also the radii of X and Y from centre O, would also vary the coupling characteristics.

Figures 11, 12, 13:
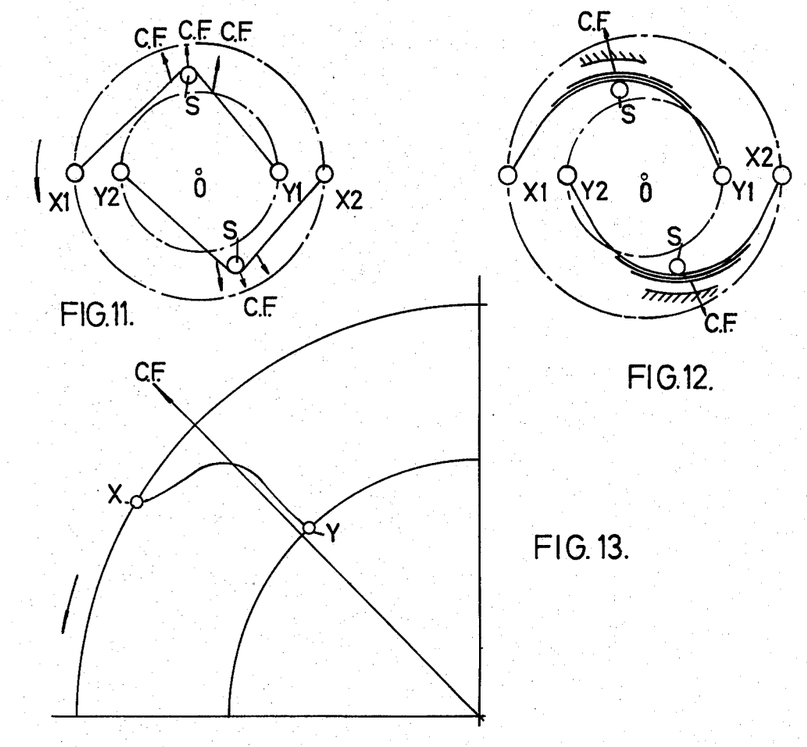
FIGS. 11 and 12 show alternative forms of connector elements.
FIG. 13 shows diagrammatically a laterally flexible connector rigidly anchored to the driving and driven members of a rotating coupling.

Although only a two-link linkage has so far been illustrated and described the invention includes within its scope a coupling in which the or each connector element has two or more links. X and Y could thus be connected by a plurality of links pivotally joined end-to-end (and any or all of such pivots could be torsionally resilient bushes), or by a longitudinally rigid but laterally flexible continuous connection — such as, for example, a wire rope — forming in effect an infinite number of links joined end-to-end as shown in FIG. 11. Rider weights could be added to such a continuous connection, the effective centre of gravity of the connection and the weights (neglecting the proportion of the weight supported at Xo and Yo) constituting the equivalent of the point J in the foregoing embodiments, and the connection secured at its ends to rotatable or partly rotatable resilient pivots, thus causing the connection to bow outwardly due to centrifugal force when the coupling has accelerated up to the predetermined speed and enabling torque curves similar to those of the foregoing embodiments to be produced.

An embodiment using this kind of connection would require a flexible stop between the members X and Y to accommodate any reversal of the drive or "over-run" tendency, such as might occur when the transmission system of which the coupling forms part is being run down to a halt.

The features of such an embodiment could, of course, vary within the scope of the invention; for example a plurality of connections could be used, arranged to extend in parallel paths between pairs of points Xo and Yo, and wire, braid or say nylon cord could be used (alone or in combination) as the connecting material. Another, similar, embodiment could use connections in the form of thin, broad strips of spring steel such as shown in FIG. 12, and these could be laminated in a manner similar to that used on vehicle leaf springs. It is thought that such a coupling, of very low stiffness/torque ratio, having its connecting linkage in any of these forms of flexible connection, might find application where the inertia of the driven member is far higher than that of the driving member and the speed of rotation of the coupling is likely to be of the order of say 20,000 r.p.m. A turbine driving a heavy rotating mass through reduction gearing is one such application.

If the coupling has, for example, more than two connector elements each comprising two or more pivotally connected links, and the X and Y pivots are spaced apart by a large angle, Stops S, such as described with reference to FIG. 5, associated with each connector element may conveniently be employed to prevent fouling of the links when the coupling is accelerated.

It will be appreciated that, when laterally flexible continuous connections of any of the kinds outlined above are used as the linkages, the ends of each connection could be anchored to rigid projections from the members, rather than to pivots or torsionally resilient bushes. FIG. 13 shows the shape such a connection would assume when deflecting under C.F. (centrifugal force) when the coupling is rotating above the predetermined speed.

Figure 14:
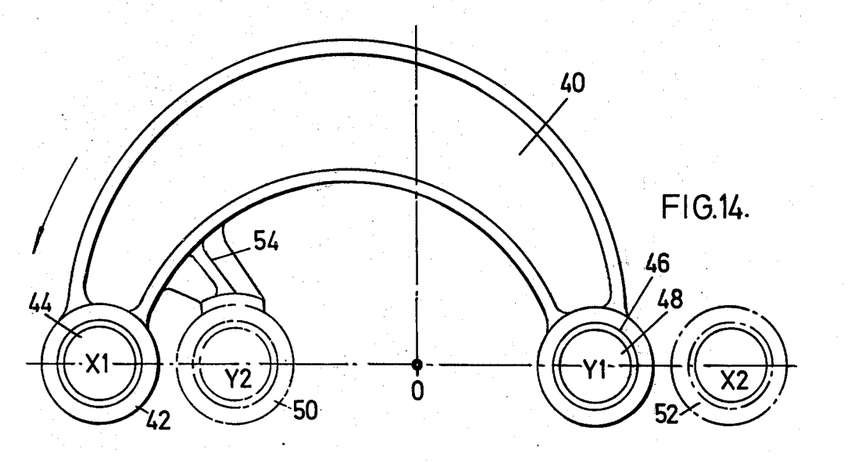
FIGS. 14 and 15 each show a two connector coupling with alternative arrangements of the connectors.

FIG. 14 shows part of a coupling having two crescent-shaped resilient connectors only one of which, 40, is shown in full. The connector 40 has at one end a boss 42 pivotally connected to a pin 44 mounted on the driving member, and at the other end a boss 46 pivotally connected to a pin 48 mounted on the driven member. Only the bosses 50 and 52 of the other connector are shown.

The connector 40 is I shaped in cross-section and is integrally formed with a stop member 54 for abbutting against the boss 50 to prevent rotational deflection of the driving member relative to the driven member in the direction of drive when the coupling is at rest or rotating at a speed less than a predetermined speed.

Figure 15:
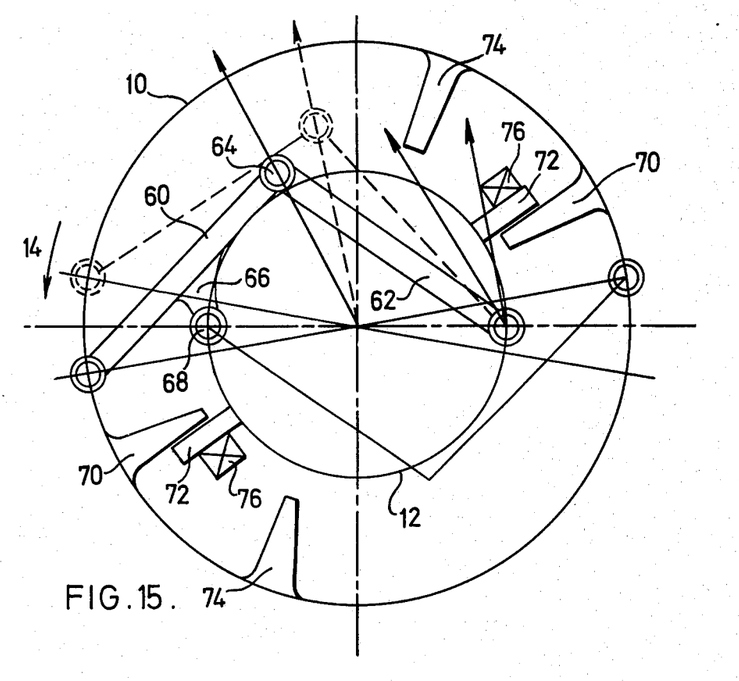

FIG. 15 shows part, of a two connector coupling in which each connector comprises two pivoted links. Only the upper connector is shown in full and has a link 60 pivotally connected to the driving member 10 and a link 62 pivotally connected to the driven member 12. The links are pivotally interconnected at 64. Two alternative stop means are indicated: in one, a projection 66 is mounted on link 60 which projection abuts against the boss 68 of the lower connector where it is connected to the driven member 12 to prevent rotational deflection of the driving member relative to the driven member in the direction of drive when the coupling is at rest or rotating at a speed below a predetermined speed; in the other, projections 70 and 72 are provided on the driving and driven members 10 and 12 respectively, the projections abutting when the coupling is at rest or rotating at a speed below the predetermined speed.

A further projection 74 is provided on the driving member 10 for abutting against the projection 72 when the drive is reversed or the driven member over-runs. A resilient member 76 is mounted on the projection 72 to cushion the abutment between the projections 72, and 74.

The action of centrifugal force on the connectors shown in FIGS. 14 and 15 is similar to that described with reference to FIG. 1, causing rotational deflection between the driving and the driven members when the coupling has accelerated to a speed above the predetermined speed. The deflection takes place in FIG. 14 by resilient deformation of the link 40, and in FIG. 15 by pivoting of the links 60 and 62 at the pivotal connection 64. This allows rotational deflection of the driving member relative to the driven member to occur in either direction of rotation.

Figure 16:
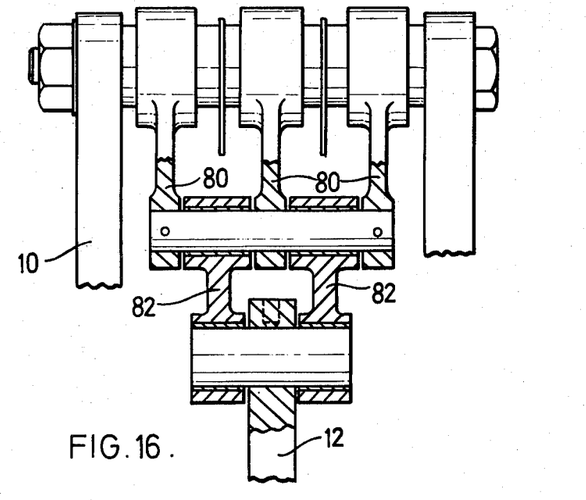
FIG. 16 shows a part sectional view of a connector and linkage pivots for a large capacity coupling.

FIG. 16 shows a further possible arrangement where, in a coupling where the coupling elements are linkages, a number of linkages are arranged in parallel to increase the torque capacity at a given speed or with a given swept diameter. Three "X" linkages 80 are pivotally connected to two "Y" linkages 82, each set of X and Y linkages being arranged in parallel. The X linkages are pivotally connected to a driving member 10 and the Y linkages are pivotally connected to a driven member 12. Although three X linkages are shown in this Figure, there may be two or more.

In the embodiments outlined in this specification, the linkages are preferably equally spaced around the coupling when the coupling is viewed in end elevation.

I claim:

1. A rotatable coupling comprising a driving and a driven member rotatable about a common axis and between which is connected one or more coupling elements for transmitting torque from the driving to the driven member, the or each coupling element being arranged so that rotational deflection of the driving member relative to the driven member cannot take place in the direction of drive when the coupling is rotating below a predetermined speed, and to allow rotational deflection of the driving member relative to the driven member in either direction of rotation when the coupling rotates at a speed above the predetermined speed.

2. A rotatable coupling as claimed in claim 1 wherein the or each coupling element is arranged such that, on rotation of the coupling, the centrifugal force on the or each coupling element acts to exert between the members a centrifugal force which tends to deflect the driven member relative to the driving member in the direction of drive.

3. A rotatable coupling as claimed in claim 2 further comprising counter torque means arranged to exert between the members a counter torque greater than and opposite to the centrifugal torque for coupling speeds up to the predetermined speed.

4. A rotatable coupling as claimed in claim 3 wherein the arrangement of the or each coupling element and the counter torque means is such that, over a range of deflection and/or speeds greater than the predetermined speed, the increase in centrifugal torque resulting from an increase in deflection between the members, is opposite and substantially equal to the corresponding increase of the counter torque exerted by the counter torque means.

5. A rotatable coupling as claimed in claim 3 wherein the counter torque means is in the form of a torsion bar connected between the driving and driven members.

6. A rotatable coupling as claimed in claim 3 wherein the counter torque means is in the form of one or more coil springs arranged between radially extending projections on the driving and driven members respectively.

7. A rotatable coupling as claimed in claim 3 wherein the or each coupling element is in the form of a plurality of links pivotally connected in end to end relationship between the members.

8. A rotatable coupling as claimed in claim 7 wherein the counter torque means is in the form of one or more torsionally resilient bushes at one or more of the pivotal connections between a said link and an adjacent link, or between a said link and the driving or driven member.

9. A rotatable coupling as claimed in claim 7 wherein the or each coupling element is arranged such that, when the coupling is at rest or rotating at a speed below the predetermined speed, the pivotal connections of the links lie in a straight line, to prevent deflection of the driving member relative to the driven member in the direction of drive.

10. A rotatable coupling as claimed in claim 1 wherein the or each connector element comprises a continuous laterally flexible member.

11. A rotatable coupling as claimed in claim 1 further comprising first stops for abutting when the coupling is at rest or rotating at a speed below the predetermined speed, thereby to prevent deflection of the drive member relative to the driven member in the direction of drive.

12. A rotatable coupling as claimed in claim 11 further comprising second stops for abutting when a predetermined deflection is reached, to prevent further deflection of the driven member relative to the driving member in the direction of drive.

13. A rotatable coupling as claimed in claim 12 wherein the second stops are resilient.

* * * * *